US007509534B2

(12) United States Patent
Rajamani et al.

(10) Patent No.: US 7,509,534 B2
(45) Date of Patent: Mar. 24, 2009

(54) COUNTEREXAMPLE DRIVEN REFINEMENT FOR ABSTRACT INTERPRETATION

(75) Inventors: Sriram K. Rajamani, Bangalore (IN); Bhargav Gulavani, Mumbai (IN)

(73) Assignee: Microsoft Corporation, Redmond, WA (US)

( * ) Notice: Subject to any disclaimer, the term of this patent is extended or adjusted under 35 U.S.C. 154(b) by 293 days.

(21) Appl. No.: 11/470,066

(22) Filed: Sep. 5, 2006

(65) Prior Publication Data
US 2008/0034353 A1    Feb. 7, 2008

(30) Foreign Application Priority Data
Jun. 27, 2006    (IN)    .................. 1517/DEL/2006

(51) Int. Cl.
G06F 11/00    (2006.01)
(52) U.S. Cl. ................... 714/38; 717/124; 717/131
(58) Field of Classification Search ............ 714/38; 717/124, 131, 132
See application file for complete search history.

(56) References Cited

U.S. PATENT DOCUMENTS

| | | | | |
|---|---|---|---|---|
| 5,854,924 | A * | 12/1998 | Rickel et al. ................. | 717/132 |
| 6,059,837 | A * | 5/2000 | Kukula et al. ................. | 703/27 |
| 6,694,290 | B1 * | 2/2004 | Apfelbaum et al. ............ | 703/22 |
| 7,092,858 | B1 * | 8/2006 | Kukula et al. ................. | 703/2 |
| 7,346,486 | B2 * | 3/2008 | Ivancic et al. ................. | 703/22 |
| 2005/0060691 | A1 * | 3/2005 | Das et al. ..................... | 717/132 |
| 2005/0216793 | A1 * | 9/2005 | Entin et al. ................... | 714/38 |
| 2005/0229044 | A1 * | 10/2005 | Ball ............................. | 714/38 |
| 2007/0006151 | A1 * | 1/2007 | Conway et al. ............... | 717/120 |
| 2007/0016894 | A1 * | 1/2007 | Sreedhar ...................... | 717/131 |
| 2007/0220346 | A1 * | 9/2007 | Dams ........................... | 714/38 |
| 2008/0126063 | A1 * | 5/2008 | Beer et al. .................... | 703/14 |

OTHER PUBLICATIONS

Bagnara, Roberto et al., "Precise Widening Operators for Convex Polyhedra," SAS'03, Static Analysis, 2003, Springer-Verlag, 18 pages.
Bagnara, Roberto, Patricia M. Hill and Enea Zaffanella, "Widening Operators for Powerset Domains," VMCAI'04, 2004, Springer-Verlag, 14 pages.
Ball, Thomas and Sriram K. Rajamani, "Automatically Validating Temporal Safety Properties of Interfaces," SPIN'01 Workshop, LNCS 2057, 2001, Springer-Verlag, 20 pages.

(Continued)

Primary Examiner—Marc Duncan
(74) Attorney, Agent, or Firm—Perkins Coie LLP (57) ABSTRACT

A refinement system automatically identifies whether a detected error in a target system during abstract interpretation is a false error or a true error and adjusts the interpretation to prevent the false error. The target system is represented as a transition system with an initial state and state transitions and a specification that the target system is to satisfy. The refinement system iteratively performs steps of the abstract interpretation using a widening operator. When the state of a step does not satisfy the specification, the refinement system identifies a step whose widening operator was the source of the state that did not satisfy the specification and applies a more precise operator that eliminates the problem with the widening. The refinement system then starts re-performing the steps starting at that step.

20 Claims, 6 Drawing Sheets

OTHER PUBLICATIONS

Benoy, Patricia Mary, "Polyhedral Domains for Abstract Interpretation in Logic Programming," University of Kent at Canterbury Thesis Paper, Jan. 2002, 150 pages.

Bourdoncle, Francois, "Abstract Interpretation by Dynamic Partitioning," Mar. 1991, Research Report No. 18, digital Paris Research Laboratory, © Digital Equipment Corporation 1991, 42 pages.

Chaki, Sagar Edmund Clarke and Alex Groce, "Modular Verification of Software Components in C," Transactions of Software Engineering, vol. 1, No. 8, Sep. 2004, pp. 1-31.

Clarke, Edmund et al., "Counterexample-guided Abstraction Refinement," CAV'00, LNCS 1855, Springer-Verlag, 2000, pp. 154-169.

Cousot, Patrick and Nicolas Halbwachs, "Automatic Discovery of Linear Restraints among Variables of a Program," 5th Annual ACM Symposium on Principles of Programming Languages, Jan. 1978, pp. 84-96.

Cousot, Patrick and Radhia Cousot, "Abstract Interpretation: A Unified Lattice Model for Static Analysis of Programs by Construction or Approximation of Fixpoints," 4th ACM Symposium on Principles of Programming Languages, Jan. 1977, pp. 238-252.

Graf, Susanne and Hassen Saidi, "Construction of abstract state graphs with PVS," Proceedings of CAV'97, LNCS 1254, Springer Verlag 1997, 18 pages.

Henzinger, Thomas A. et al., "Lazy Abstraction," POPL'02, Jan. 2002, Portland, Oregon, © 2002 ACM, 13 pages.

Jeannet, Bertrand, Nicolas Halbwachs and Pascal Raymond, "Dynamic Partitioning in Analyses of Nurmerical Properties," SAS'99, LNCS 1694, Springer Verlag 1999, pp. 39-50.

Rustan, K., M. Leino and Francesco Logozzo, "Loop Invariants on Demand," APLAS 2005, LNCS 3780, © 2005 Springer-Verlag Berlin Heidelberg, pp. 119-134.

Sagiv, Mooly, Thomas Reps and Reinhard Wilhelm, "Parametric Shape Analysis via 3-Valued Logic," 26th ACM Symposium on Principles of Programming Languages, Jan. 1999, pp. 1-14.

Sankaranarayanan, Sriram, "Stanford Invariant Generator," 9 pages, http://theory.stanford.edu/~srirams/Software/sting.html [last accessed Feb. 15, 2007].

Sankaranarayanan, Sriram, Henny B. Sipma and Zohar Manna, "Constraint-Based Linear-Relations Analysis," SAS'04, Springer - Verlag 2004, 16 pages.

Yang, Hongseok, "Tutorial on Widening (and Narrowing)," Seoul National University, 18 pages, http://ropas.snu.ac.kr/~hyang/paper/widening.ppt [last accessed Feb. 15, 2007].

* cited by examiner

COUNTEREXAMPLE DRIVEN REFINEMENT FOR ABSTRACT INTERPRETATION

CROSS-REFERENCE TO RELATED APPLICATION

This application claims the benefit of Indian patent application Ser. No. 1517/DEL/2006, entitled "COUNTEREXAMPLE DRIVEN REFINEMENT FOR ABSTRACT INTERPRETATION," filed on Jun. 27, 2006, which application is incorporated by reference in its entirety.

BACKGROUND

Abstract interpretation is a theory for approximating the semantics of systems, such as computer programs and industrial designs, based on monotonic functions over ordered sets, especially lattices. Abstract interpretation can be viewed as a partial execution of a computer program that gains information about its semantics (e.g., control structure and flow of information) without performing all the calculations of the program. Abstract interpretation computes fixpoints for programs that each represent a state of the abstract interpretation of the program at some point or step of interpretation. Abstract interpretation can be used to determine whether a program satisfies a condition (e.g., the value of variable B is never greater than 100). If all fixpoints computed by an abstract interpretation of the program satisfy the condition, then all concrete behaviors of the program satisfy the condition. If a fixpoint, however, does not satisfy the condition, then there are two possibilities. First, the program does not satisfy the condition, and a "true error" in the program has been found. Second, the program satisfies the condition but the abstract interpretation was not precise enough to verify it, and a "false error" in the program has been found. Abstract interpretations represent programs with varying degrees of precision to accommodate programs with infinite domains or to efficiently accommodate very large programs. If the precision is too low, the abstract interpretation will, however, detect many false errors, which reduces its usability.

Predicate abstraction is a form of abstract interpretation in which concrete states are abstracted by their valuation to a finite set of predicates. Several tools are available that use predicate abstraction to verify finite state interface protocols on programs. To reduce false errors, these tools typically analyze an abstract counterexample to check whether the counterexample is feasible in the concrete program. A counterexample indicates that the condition of the program is not satisfied. If the counterexample is feasible, the tools add more predicates to improve the precision of the predicate abstraction. This process, referred to as "counterexample driven refinement," continues iteratively until (1) the condition is proved, (2) a true error is found, or (3) resources (e.g., time or memory) are exhausted.

Abstract interpretations generally operate over mathematical lattices and compute the semantics of programs as fixpoints. Such fixpoint computations may not converge, however, if the lattice has infinite ascending chains. To ensure convergence of fixpoints, abstract interpretations use a "widening" technique to over-approximate the semantics. The widening operator $\nabla$ has the property that for all states x and y the result $x\nabla y$ is greater than both x and y. Furthermore, widening guarantees convergence of fixpoint computation in that in any infinite increasing sequence $x_0, x_1, x_2, \ldots$, the sequence $y_0, y_1, y_2, \ldots$, given by $y_0=x_0$ and $y_{i+1}=y_i\nabla(y_i\cup x_{i+1})$ is guaranteed to converge.

SUMMARY

A method and system for verifying an abstract interpretation of a system using counterexample driven refinement is provided. The refinement system abstractly represents a target system as a transition system with an initial state and state transitions and a specification that the target system is to satisfy. The refinement system iteratively performs steps of the abstract interpretation starting with the initial state to generate resulting states. The refinement system then applies a widening operator to the resulting states to establish over-approximated states of the step. After the states of a step are established, the refinement system determines whether the states of the step include an error state and thus will not satisfy the specification. If the states include an error state, the refinement system determines whether the error is a false error or a true error. To make this determination, the refinement system identifies which of the previous steps established a state as a result of the over-approximation of the widening operator that led to the error state. If the refinement system does not identify such a step, then the error is a true error. If the refinement system does identify such a step, the refinement system then applies a more precise operator at that step to establish new states for that step that do not include the state that led to the error state. The refinement system then re-performs the next step using the new states to establish states and continues this process for subsequent steps using the widening operator until the states converge.

DETAILED DESCRIPTION

A method and system for verifying an abstract interpretation of a system using counterexample driven refinement is provided. In one embodiment, the refinement system abstractly represents a target system, such as a computer program, as a transition system with an initial state and state transitions, and a specification that the target system is to satisfy. The state transitions specify possible transitions from one state to another state. The specification provides conditions of the target system that are to be verified by the abstract interpretation. The specification may be represented as error states. The refinement system checks whether an abstract interpretation satisfies its specification by performing the steps of the abstract interpretation. The refinement system performs the first step of the abstract interpretation on the initial state to generate resulting states. The refinement system then applies a widening operator to the resulting states to establish over-approximated states of the first step. The refinement system then performs the second step of abstract interpretation and applies the widening operator to the resulting states of the second step to establish an over-approximation of the states of the second step. The refinement system continues this process for the third and subsequent steps. After the states of a step are established, the refinement system determines whether the states of the step include an error state and thus will not satisfy the specification. If the states include an error state, the refinement system determines whether the error is a false error or a true error. To make this determination, the refinement system identifies which of the previous steps established a state as a result of the over-approximation of the widening operator that led to the error state. If the refinement system does not identify such a step, then the error is a true error. If the refinement system does identify such a step, the refinement system then applies a more precise operator at that step to establish new states for that step that do not include the state that led to the error state. The refinement system then re-performs the next step using the new states to establish states and continues this process for subsequent steps using the widening operator until the states converge. If the refinement system subsequently detects that the states of a step include an error state and identifies a step whose widening operator led to the error state (e.g., the source of the imprecision leading to the error), the refinement system will establish the states of subsequent steps using the widening operator or using a more precise operator if the step had previously been identified as the source of an imprecision leading to the error. In this way, the refinement system identifies errors in an abstract interpretation, determines whether the error is a false error or a true error, and automatically refines the abstract interpretation to remove the false errors.

Figure 1:
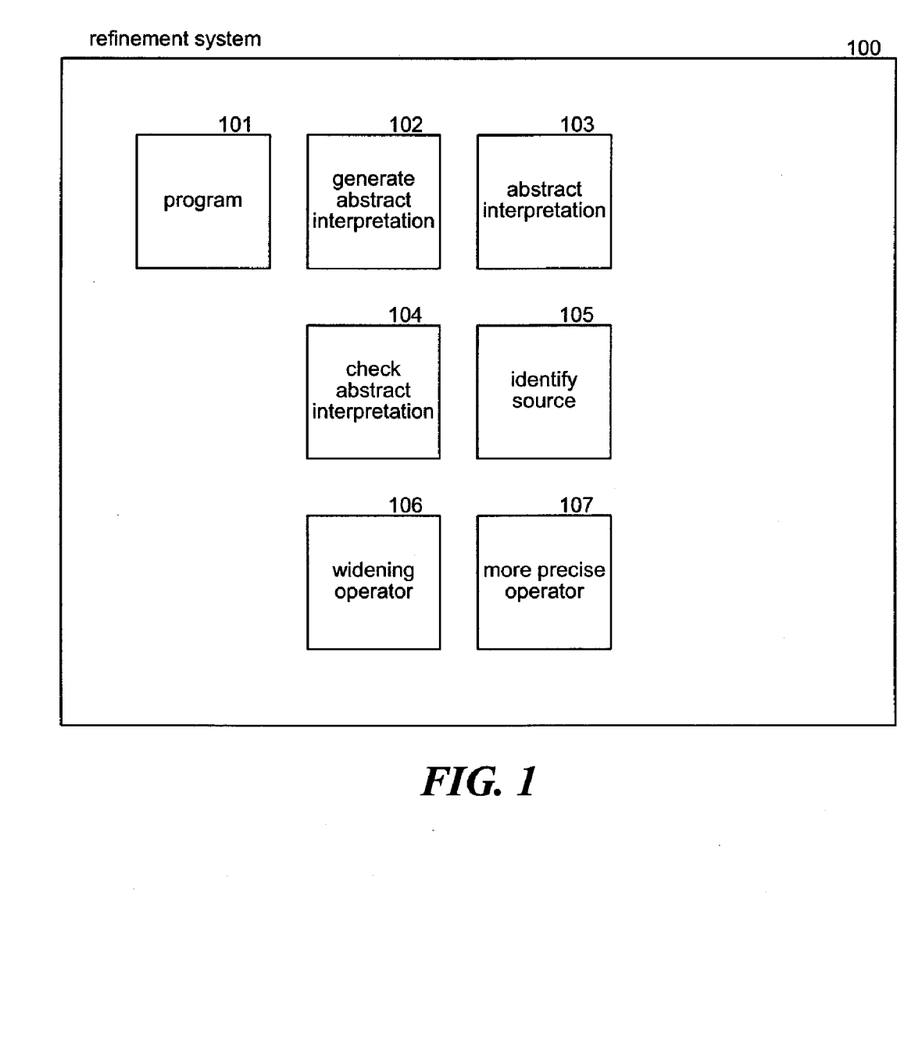
FIG. 1 is a block diagram that illustrates components of the refinement system in one embodiment.

FIG. 1 is a block diagram that illustrates components of the refinement system in one embodiment. The refinement system 100 includes a target program 101, a generate abstract interpretation component 102, and an abstract interpretation 103. The generate abstract interpretation component inputs the target program and its specification and generates the abstract interpretation for the target program. The refinement system also includes a check abstract interpretation component 104, an identify source component 105, a widening operator component 106, and a more precise operator component 107. The check abstract interpretation component inputs the abstract interpretation and indicates whether the abstract interpretation of the target program satisfies the specification. The check abstract interpretation component performs the steps of the abstract interpretation using the widening operator component. When a step establishes a state that is an error state, the check abstract interpretation component invokes the identify source component to identify the step that is the source of the imprecision leading to the error. The check abstract interpretation component invokes the more precise operator component to more precisely calculate the states of that step. If the check abstract interpretation component does not identify the source of the imprecision leading to the error, then the component indicates a true error. If the check abstract interpretation component determines that the states of the steps of the abstract interpretation have converged, then the component reports that the abstract interpretation has been verified as satisfying the specification.

The computing devices on which the refinement system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the refinement system. In addition, the data structures may be stored or transmitted via a data transmission medium, such as a signal on a communications link. Various communications links may be used to connect components of the system, such as the Internet, a local area network, a wide area network, a point-to-point dial-up connection, a cell phone network, and so on.

Embodiments of the refinement system may be implemented in various operating environments that include personal computers, server computers, multiprocessor systems, microprocessor-based systems, network PCs, minicomputers, mainframe computers, distributed computing environments that include any of the above systems or devices, and so on. The user computing devices may include cell phones, personal digital assistants, smart phones, personal computers, programmable consumer electronics, digital cameras, and so on.

The refinement system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
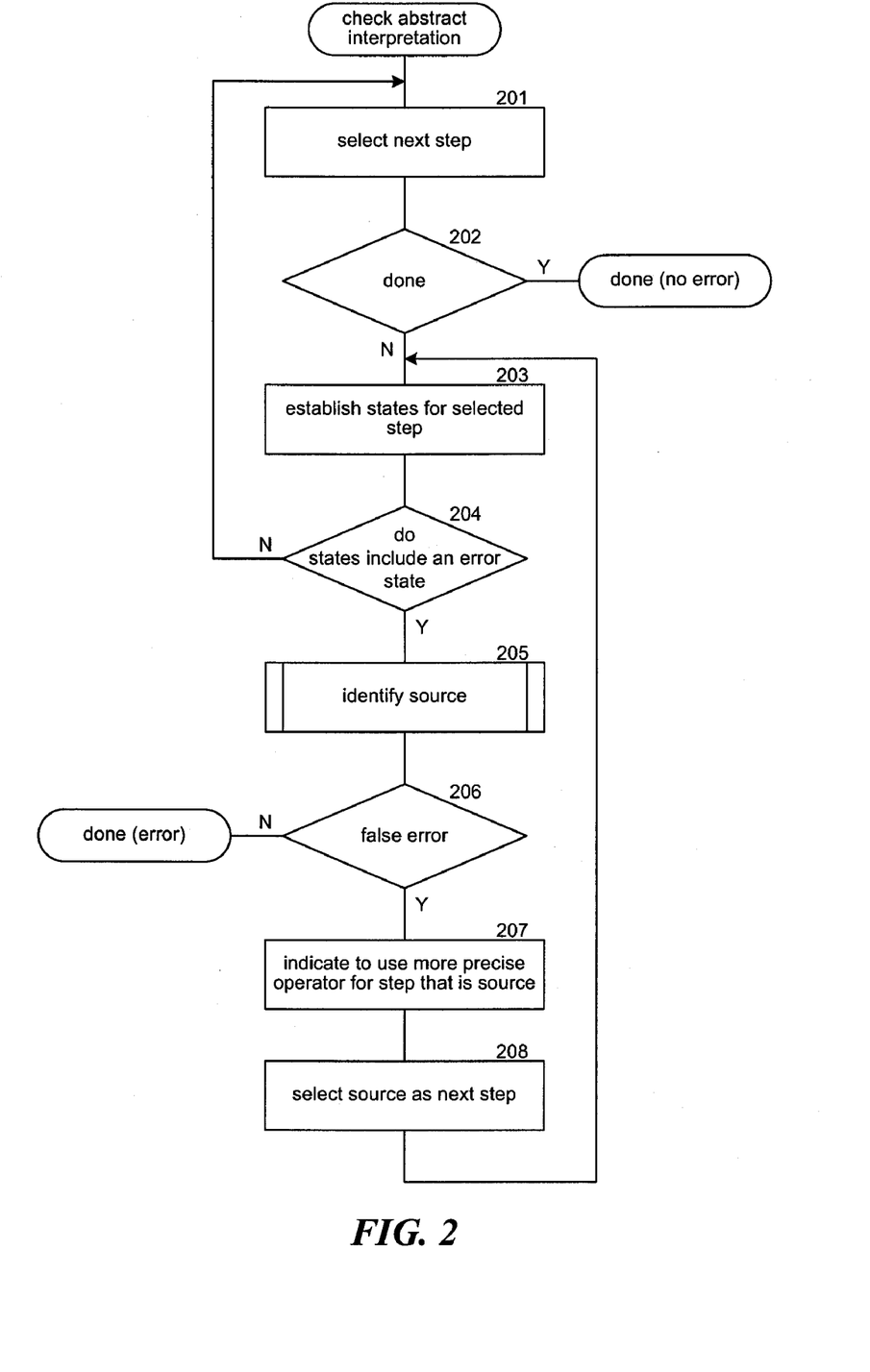
FIG. 2 is a flow diagram that illustrates the processing of the check abstract interpretation component of the refinement system in one embodiment.

FIG. 2 is a flow diagram that illustrates the processing of the check abstract interpretation component of the refinement system in one embodiment. The component is passed an abstract interpretation and returns an indication of whether the specification can be verified. In blocks 201-208, the component loops performing each step of the abstract interpretation until the states converge or an error is detected. In block 201, the component selects the next step for the abstract interpretation. In decision block 202, if the previous steps have already converged on a solution (e.g., current states are the same as the previous states), then the component completes with an indication that the specification has been verified, else the component continues at block 203. In block 203, the component establishes the states for the selected step using a widening operator (or more precise operator as appropriate). In decision block 204, if the established states include an error state, then the component continues at block 205, else the component loops to block 202 to select the next step. In block 205, the component invokes the identify source component, which performs precise backward reachability starting from the discovered error states to identify the source of the imprecision leading to the error. In decision block 206, if the error is a false error, then the component continues at block 207, else the component completes indicating a true error. In block 207, the component indicates to use a more precise operator for the step that is the source. In block 208, the component selects the source step as the next step and then loops to block 203 to start the re-establishing of the states of the steps.

Figure 3:
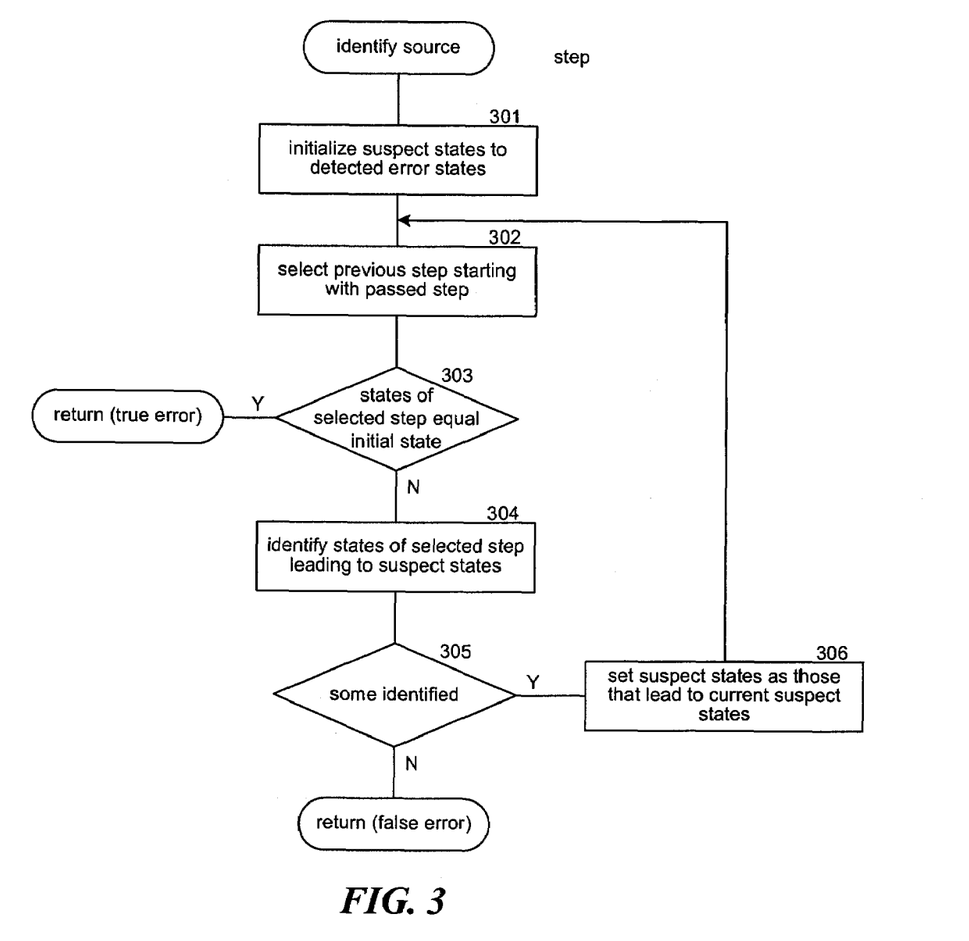
FIG. 3 is a flow diagram that illustrates the processing of the identify source component of the refinement system in one embodiment.

FIG. 3 is a flow diagram that illustrates the processing of the identify source component of the refinement system in one embodiment. The component is passed a step that generated an error state and identifies the source of the imprecision that leads to the error or indicates that the error is a true error. In block 301, the component initializes the suspect states to the detected error state. The suspect states are those states that might have led to the detected error state. In blocks 302-306, the component loops selecting previous steps to determine which step was the source of the error. In block 302, the component selects the previous step starting with the passed step. In decision block 303, if the states of the selected step equal the initial state, then the error is a true error because no widening operator led to the error state and the component returns an indication of a true error, else the component continues at block 304. In block 304, the component identifies states of the selected step that led to the suspect states. In decision block 305, if some states are identified, then the selected step is not the source of the imprecision leading to the error and the component continues at block 306, else the component returns an indication that the error is a false error along with an indication of the step that is the source of the false error. In block 306, the component sets the suspect states to those that led to the current suspect states. The component then loops to block 302 to determine whether the previous step is a source of the error state.

The refinement system operates on a possibly infinite domain called "States." The domain States has a precise LUB operator $\cup$ and a widening operator $\nabla$. A transition system $\Theta$, representing a computer program, is a pair $(I,\theta)$ where $I \subseteq$ States and $\theta: 2^{States} \to 2^{States}$. The operator $\theta$ is referred to as the "image" operator, which takes a set of states as input and gives the set of possible next states as output. The operator $\theta^{-1}$ is referred to as the "pre-image" operator, which takes the set of states as input and gives a set of possible previous states as output.

The refinement system represents programs as transition systems. A program P is a triple $\langle V,I,T \rangle$, where V is a finite set of variables, each of which takes a value from a potentially infinite domain. For example, a program may have the variable count that has the domain of all integers and the variable index that has the domain of 1 to 100. A state represents a set of values for all the variables in V. For example, (count=201, index=50) and (count=300, index=1) are both states. The set of all possible values of V is the domain States. For example, the set of every possible combination of count and index represents the domain of States.

I is a set of initial values of variables in V.

$T \subseteq States \times States$ is a binary relation such that T(s,s') holds whenever it is possible for the program to transition from state s to state s' in one step. For example, if index is only incremented by one in the program, then it is not possible to transition from a state with index=5 to a state with index=7 in one step.

A program $P=\langle V,I,T \rangle$, thus provides a transition system $\Theta = \langle I,\theta \rangle$, where $\theta(S)=\{s'|\exists s \in S.T(s,s')\}$, and $\theta^{-1}(S)=\{s|\exists s' \in S.T(s,s')\}$.

The refinement system represents a set of error states of a program as a specification $\psi \subseteq$ States. To check if a transition system $\Theta = \langle I,\theta \rangle$, satisfies a specification $\psi$ (i.e., does not transition to an error state), the refinement system computes an over-approximation to the set of reachable states of the system, and checks if the over-approximation intersects (e.g., does not satisfy) specification $\psi$. If the over-approximation does satisfy the specification, then an exact or precise set of reachable states would also satisfy the specification. The refinement system represents that exact set (or least fixpoint) as $PreciseReach(\Theta)=\mu X.I \cup X \cup \theta(X)$ (where $\mu X.A$ represents the least fixpoint computation of expression A), though the fixpoint computation may not terminate. The transition system $\Theta$ satisfies specification $\psi$ if and only if $PreciseReach(\Theta) \cap \psi = \emptyset$, that is, the precise set includes no error states.

The refinement system uses a widening operator $\nabla$ to help ensure termination of a fixpoint computation at the cost of losing precision. If $S_1$ and $S_2$ are each a set of states such that $S_1 \subseteq S_2$, then $S_3 \subseteq S_1 \nabla S_2$ is a set of states such that $S_1 \subseteq S_3$ and $S_2 \subseteq S_3$. Further, there is some metric (such as the number of conjunctions in the formula representing the set) that decreases from $S_1$ to $S_3$. When the refinement system uses an over-approximation or a least fixpoint $WidenReach(\Theta)=\mu X.(I \cup X) \nabla (I \cup X \cup \theta(X))$, (1) the computation of $WidenReach(\Theta)$ will terminate, and (2) $WidenReach(\Theta) \supseteq PreciseReach(\Theta)$. Thus, the transition system $\Theta$ will satisfy the specification $\psi$ when $WidenReach(\Theta) \cap \psi = \emptyset$, that is, when it does not include any error states. If, however, $WidenReach(\Theta) \cap \psi \neq \emptyset$, the refinement system cannot distinguish between the possibilities that either the transition system $\Theta$ does not satisfy specification $\psi$ or the computation of WidenReach lost too much precision.

The refinement system keeps track of the intermediate states in the fixpoint computation, so that it can generate an abstract counterexample that can be automatically analyzed to classify if the error found is a false error or a true error. If it is a false error, the refinement system can also identify the precise point or step at which the abstract counterexample needs to be refined to avoid the recurrence of the specific false error.

The refinement system thus represents the fixpoint computation by the following equation:

$$WidenReach(\Theta)=\mu X.(I \cup X) \nabla (I \cup X \cup \theta(X))$$

The fixpoint computation can be further represented by the following equation:

$$R_i = R_{i-1} \nabla (R_{i-1} \cup \theta(R_{i-1}))$$

where $R_i$ represents the state of the transition system $\Theta$ at step i and $R_0=I$. If n is the smallest index of a step in which an error is detected (i.e., $R_n \cap \psi \neq \emptyset$), the refinement system looks from step n backwards to find the step whose widening is the source of the imprecision leading to the false error. If $(R_{n-1} \cup \theta(R_{n-1})) \cap \psi = \emptyset$, then step n is the source of the false error. To prevent precision loss at this step, the refinement system replaces the widening operator with the LUB operator in that particular step of the fixpoint computation. Otherwise, if $(R_{n-1} \cup \theta(R_{n-1})) \cap \psi \neq \emptyset$, then the refinement system needs to backtrack to the source of the imprecision leading to the error. The refinement system identifies suspect states as $\psi_s = \theta^{-1}(R_n \cap \psi)$, that is, error states that are in $R_n$. Any step that has one of the suspect states may be the source of the imprecision leading to the error. The refinement system then checks whether the states of the previous step satisfy the specification. If so, the widening system refines the widening operator of the next step n−1 to make it more precise. If not, then the widening of the previous step did not result in step n not satisfying the specification. The refinement system continues this process until it finds either an index where the widening operator needs to be refined into a LUB operator ($\cup$) to avoid the false error, or the repeated backward propagation of the error state intersects with the initial state $R_0=I$, in which case the error is a true error.

The refinement system represents an abstract domain $\hat{D}=\langle D,\vdash,0,\oplus \rangle$, as a join-semilattice where D is a concrete domain, $\vdash$ is a partial order, 0 is the bottom element of the lattice, and the LUB $d_1 \oplus d_2$ exists for all pairs of elements in D, that is, $d_1,d_2 \in D$. For example, convex hull is such an operator for convex polyhedra. For all $d_1,d_2 \in D$, $d_1 \Vdash d_2$ means that $d_1$ is ordered strictly before $d_2$, that is, $d_1 \vdash d_2$ and $d_1 \neq d_2$, which means that $d_2$ has more information than $d_1$.

The standard widening operator, used by Cousot, P. and Halbwachs, N., "Automatic Discovery of Linear Restraints Among Variables of a Program, POPL 78: Principles of Programming Languages, ACM Press, 1978, pp. 84-97, is represented by the following equation:

$$d_1 \nabla d_2 \triangleq \bigwedge \{c_j | d_2 | - c_j\}$$

where $d_1 = \bigwedge_i c_i$ means that $d_1$ is defined by the conjunction of conditions $c_i$ and the widening operator is the set of all states to which $d_2$ can directly lead as represented by the conjunction of conditions $c_j$.

For a set S of elements, the refinement system represents $\wp(S)$ as the powerset of S (i.e., the set of all subsets of S) and $\wp_f(S)$ as the set of all finite subsets of S. For each $S \in \wp_f(D)$, the refinement system represents $\oplus S$ as the LUB of S. A set of elements $S \in \wp(D)$ is non-redundant if and only if $0 \notin S$ (i.e., does not contain the bottom element of the lattice) and $\forall d_1, d_2 \in S: d_1 | - d_2 \Rightarrow d_1 = d_2$. The set of finite non-redundant subsets of D is $\wp_{fn}(D, |-)$. A reduction function $\Omega_D^{|-}: \wp_f(D) \to \wp(D)$ maps each finite set into its non-redundant counterpart as represented by the following equation:

$$\Omega_D^{|-}(S) \triangleq S \setminus \{d \in S | d = 0 \vee \exists d' \in S \cdot d | - d'\}$$

Conceptually, the refinement system determines a non-redundant set of elements by removing the least element in the partial order and each element that is strictly before another element. The refinement system represents the finite powerset domain over $\hat{D}$ as the join-semilattice represented by the following equation:

$$\hat{D}_P = \langle \wp_{fn}(D, |-), |-_P, 0_P, \oplus_P \rangle,$$

where $0_P = \emptyset$ and $\forall S_1, S_2 \in \wp_{fn}(D, |-)$, $$S_1 \oplus_P S_2 \triangleq \Omega_D^{|-}(S_1 \cup S_2),$$

and $S_1 |-_P S_2$ if and only if $\forall d_1 \in S_1: \exists d_2 \in S_2 . d_1 | - d_2$; that is, $S_1$ is followed by $S_2$ if and only if each state of $S_1$ leads to a state in $S_2$.

The refinement system represents the relation $S_1 \preceq S_2$ to be true if and only if either $S_1 = 0_P$ or $S_1 |-_P S_2$ and $\forall d_2 \in S_2: \exists d_1 \in S_1 . d_1 | - d_2$. The refinement system defines a connector operator ⊞ such that for all $S_1, S_2 \in \wp_{fn}(D, |-)$, if $S_1 |-_P S_2$, then $S_1 \preceq (S_1 ⊞ S_2)$. Intuitively, the refinement system obtains $S_1 ⊞ S_2$ by minimally combining the elements of $S_2$ so as to obtain an $S_2'$ such that $S_1 \preceq S_2'$. More precisely, if $\hat{S}_2$ is a maximal subset of $S_2$ such that $\forall \hat{d} \in \hat{S}_2: \exists d_1 \in S_1 . d_1 | - \hat{d}$ and $$\tilde{S}_2 \triangleq \oplus \{d | d \in S_2 \setminus \hat{S}_2\},$$

then for any $\hat{d} \in \hat{S}^2$, let $$J_{\hat{d}} \triangleq (S_2 \setminus \{\hat{d}\}) \cup (\hat{d} \oplus \tilde{S}_2).$$

The refinement system defines $S_1 ⊞ S_2$ to be a minimal element (with respect to $|-_P$) from the set $\{J_{\hat{d}} | \hat{d} \in \hat{S}_2\}$. This particular definition of the connector, based on empirical evidence, yields very good results in the abstraction refinement algorithm of the refinement system. Moreover, if $S_1 |-_P S_2$, then $S_1 \preceq S_1 ⊞ S_2$. The refinement system defines $S_1 \nabla_P S_2$ by the following equation:

$$S_1 \nabla_P S_2 \triangleq \text{let } S_2' = \text{if } (S_1 \preceq S_2) \text{ then } S_2 \text{ else } S_1 ⊞ S_2 \text{ in } S_2' \oplus_P$$
$$\Omega_D^{|-}(\{d_1 \nabla d_2 \in D | d_1 \in S_1, d_2 \in S_2', d_1 | - d_2\})$$

where $S_1, S_2 \in \wp_{fn}(D, |-)$, where $S_1 | - S_2$.

TABLE 1

| |
|---|
| x := 0; m := 0 |
| while (x<N) |
|   if (*) m := x |
|   x := x + 1 |
| if (N>0) assert 0<=m<N |

The example program of Table 1 illustrates the need for the connector operator. The symbolic state after second iteration of the fixpoint is $$S_2' \triangleq (x \geq 0 \wedge m = 0) \vee (x \leq N \wedge x = m + 1 \wedge m \geq 0).$$

The new symbolic state that is generated after one more execution of the loop body is $S_{new} = (x \leq N \wedge x = m+2 \wedge m \geq 0)$. The result is represented by the following equation:

$$S_2'' \triangleq S_2' \oplus_P S_{new}$$
$$\triangleq (x \geq 0 \wedge m = 0) \vee (x \leq N \wedge x = m + 1 \wedge m \geq 0) \vee$$
$$(x \leq N \wedge x = m + 2 \wedge m \geq 0)$$

The refinement system computes $$S_3' \triangleq S_2' \nabla_P S_2''.$$

Since $S_2' \preceq S_2''$ does not hold, the refinement system computes $S_1' ⊞ S_2''$ by merging some of the elements of $S_2''$. In particular, the refinement system merges $$\hat{S}_2'' \triangleq (x \geq 0 \wedge m = 0) \vee (x \leq N \wedge x = m + 1 \wedge m \geq 0)$$

and $$\tilde{S}_2'' \triangleq (x \leq N \wedge x = m + 2 \wedge m \geq 0).$$

If the refinement system merges $S_2''$ with the first element of $\hat{S}_2''$, then the result is $$S_2' \boxplus S_2'' \triangleq (x \geq 0 \wedge m \geq 0 \wedge x \geq m).$$

Otherwise, if the refinement system merges $S_2''$ with the second element of $\hat{S}_2''$, then the result is $$S_2' \boxplus S_2'' \triangleq (x \geq 0 \wedge m = 0) \vee (x \leq N \wedge m \geq 0 \wedge x \geq m+1 \wedge x \leq m+2).$$

The result of widening in the first case is $x \geq 0 \wedge m \geq 0$, which is less precise than the widening result of the second case $(x \geq 0 \wedge m=0) \vee (x \leq N \wedge x \geq m+1 \wedge m \geq 0)$ when using the widening operator defined in Cousot and Halbwachs for the base domain of convex polyhedra. Thus, choosing the minimal result (second case) obtains a fixpoint that is strong enough to prove the assertion.

The widening operator $\nabla_P$ satisfies the convergence properties of a widening operator. Without transforming $S_2$ to $S_2'$ using the $\boxplus$ connector, such convergence guarantees cannot be given. The operator $\cup$ described above corresponds to the $\oplus_P$ operator.

For powerset abstract domains like the sets of convex polyhedra, the least upper bound operator $\oplus$ is the non-redundant union. Thus, the refinement system will add more and more disjuncts to the reachable set of states. It is possible that this increase in the number of disjuncts will continue infinitely even though the assertion can be satisfied by an abstract fixpoint computed by merging some intermediate disjuncts and doing widening later on. Thus, intermediate merging may provide convergence. In one embodiment, the refinement system uses the connector $\boxplus$ operator as an operator to merge some disjuncts into one convex polyhedra. The refinement system checks whether using the merging operation instead of widening avoids error. If it does, then the refinement system replaces the widening operator by the merge operation. Thus, the refinement system has three upper bound operators $\cup$, $\boxplus$, and $\nabla$ of decreasing precision. The refinement system can refine a widening operator to either the $\boxplus$ operator or the $\cup$ operator. It can also refine the $\boxplus$ operator to the $\cup$ operator. The hints that are generated by the refinement system as described below are of the form $\langle f, op \rangle$, where i is the step number and $op \in \{\cup, \boxplus\}$ is the operator to be applied after that step.

If the refinement system returns $\langle i, \cup \rangle$, then it is clear that refining the widening operator in step i to LUB will remove the abstract counterexample. However, if the refinement system returns $\boxplus, i, \boxplus \rangle$, then the widening operator in step i could be replaced either by a $\cup$ or by $\boxplus$. It is not clear whether it is desirable to convert the widening operation to $\cup$ or $\boxplus$, in this case. It is possible that exactly one choice results in computation of the abstract fixpoint necessary to prove the property, whereas the other choice leads to non-termination of the abstraction refinement cycle. Thus, it may be more advantageous to try both possibilities.

The refinement system also addresses the non-monotonicity of widening. Widening is non-monotonic; if $S_1 \subseteq S'_1$, and $S_2 \subseteq S'_2$, then it is not necessarily the case that $(S_1 \nabla S_2) \subseteq (S_1' \nabla S_2')$. Thus, refining the widening operator to a least upper bound operation in step i of the abstract fixpoint computation could result in a larger set of states in a later iteration. The refinement system avoids this problem of a larger set of states by, at every iteration of the abstract fixpoint computation, intersecting the states reached at step i with the set of states reached at step i during the previous iteration of the abstract fixpoint computation. If the step count i is greater than the number of steps of the previous iteration, then the refinement system intersects the states with the states the last fixpoint computed in the previous iteration. The handling of non-monotonicity is described in Gulavani, B., and Rajamani, S., "Counterexample Driven Refinement for Abstract Interpretation," Microsoft Corp., MSR-TR-2006-02, January 2006, which is hereby incorporated by reference.

Figure 4:
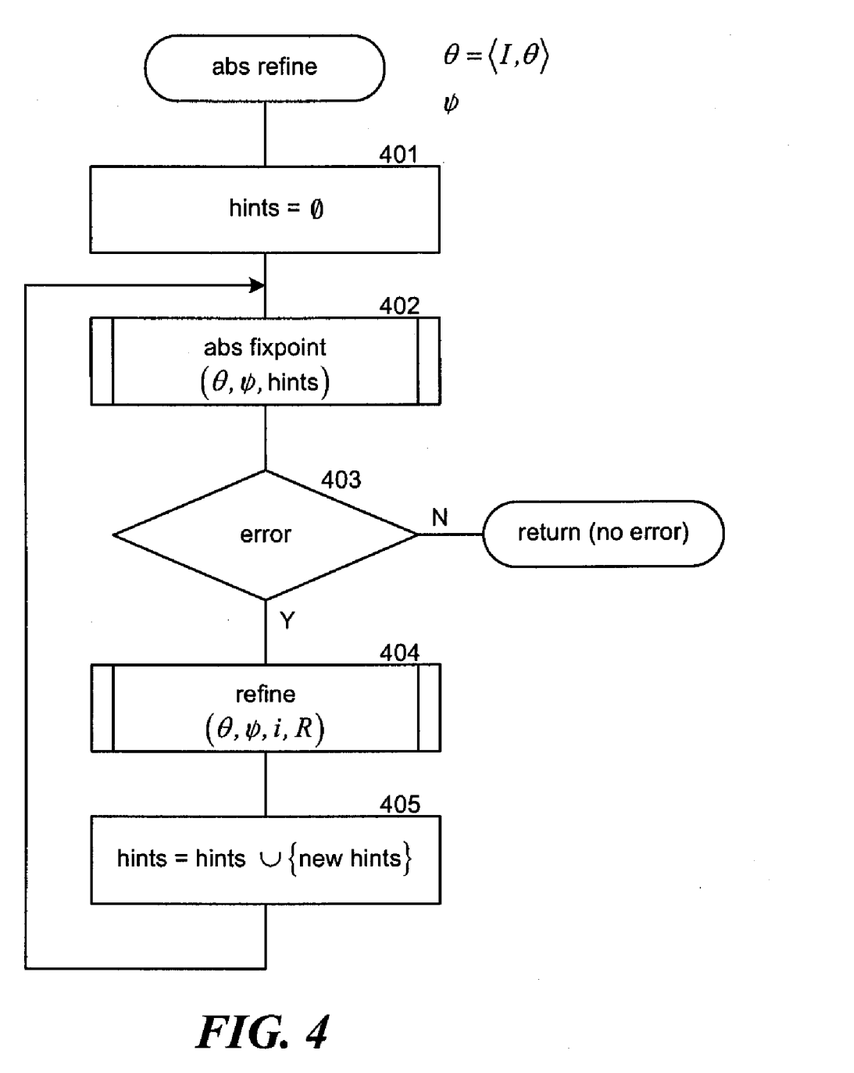
FIG. 4 is a flow diagram that illustrates the processing of an abstract refine component of the refinement system in one embodiment.

FIG. 4 is a flow diagram that illustrates the processing of an abstract refine component of the refinement system in one embodiment. The abstract refine component is an implementation of the check abstract interpretation component as described above. The component is passed a transition system and a specification. The component uses variable hints to track steps that have been previously identified as the source of an imprecision leading to an error. In block 401, the component initializes the variable hints to be empty. In blocks 402-405, the component loops generating fixpoints until an error is detected. If the error is true, then the component completes, else the component identifies the step that is a source of the imprecision leading to the error and uses a more precise operator. In block 402, the component invokes an abstract fixpoint component to calculate the fixpoints for the transition system. In decision block 403, if the invoked component determines that the result of the fixpoint calculation indicates an error, then the component continues at block 404, else the component returns an indication of no error. In block 404, the component invokes a refine component to refine the widening of the source of the error. In block 405, the component adds the source of the imprecision leading to the error to the variable hints and then loops to block 402 to continue performing the steps of the abstract interpretation.

Figure 5:
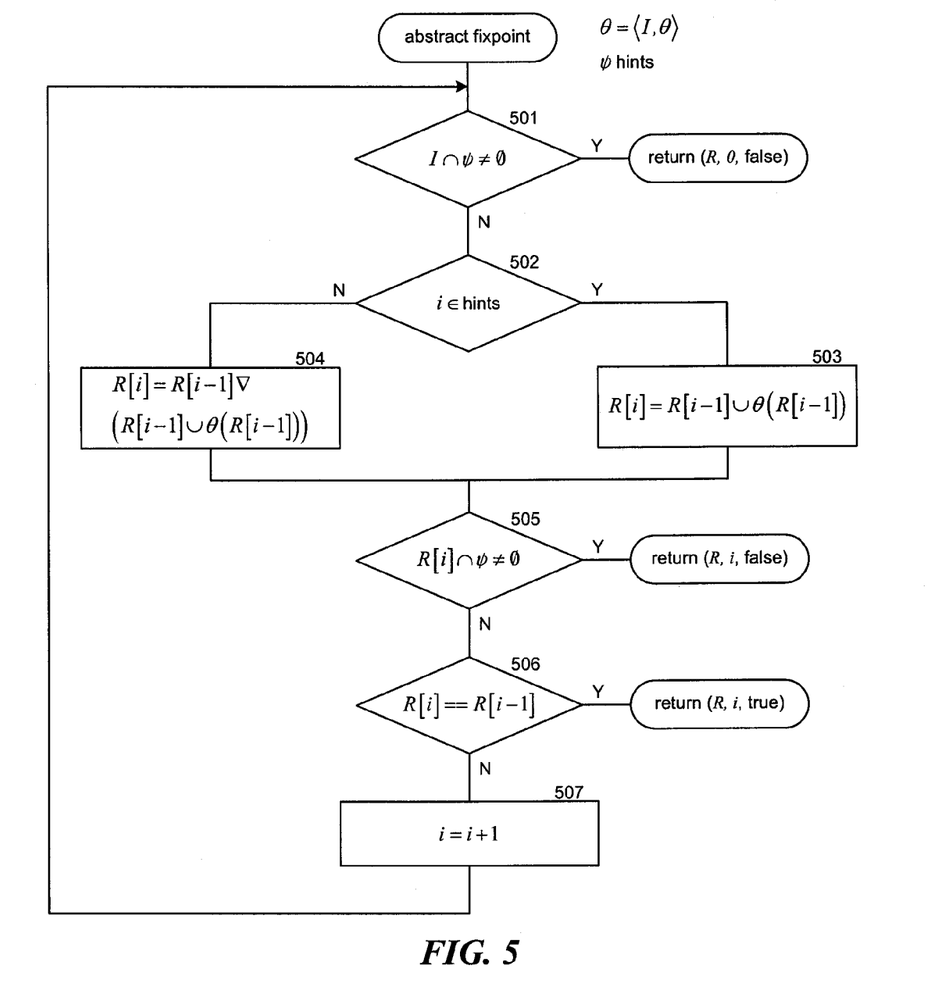
FIG. 5 is a flow diagram that illustrates the processing of the abstract fixpoint component of the refinement system in one embodiment.

FIG. 5 is a flow diagram that illustrates the processing of the abstract fixpoint component of the refinement system in one embodiment. The component is passed the transition system, the specification, and the hints. The component performs the steps of the abstract interpretation until an error is detected or it is determined that the transition system satisfies the specification. When the component is first invoked, it initializes the state to the initial state and to the first type. In decision block 501, if the initial state is an error state, then the component returns, else the component continues at block 502. In decision block 502, if the current step was the source of an imprecision leading to the error state as indicated by the variable hints, then the component continues at block 503, else the component continues at block 504. In block 503, the component uses a more precise operator for calculating the states of the current step. In block 504, the component uses the widening operator to calculate the states of the current step. In decision block 505, if a state of the current step is an error state, then the component returns an indication of an error, else the component continues at block 506. In decision block 506, if the states of the current step has the same states as a last step, then the abstract interpretation has been verified as satisfying the specification and the component returns, else the component continues at block 507. In block 507, the component selects the next step and then loops to block 501 to process that step.

Figure 6:
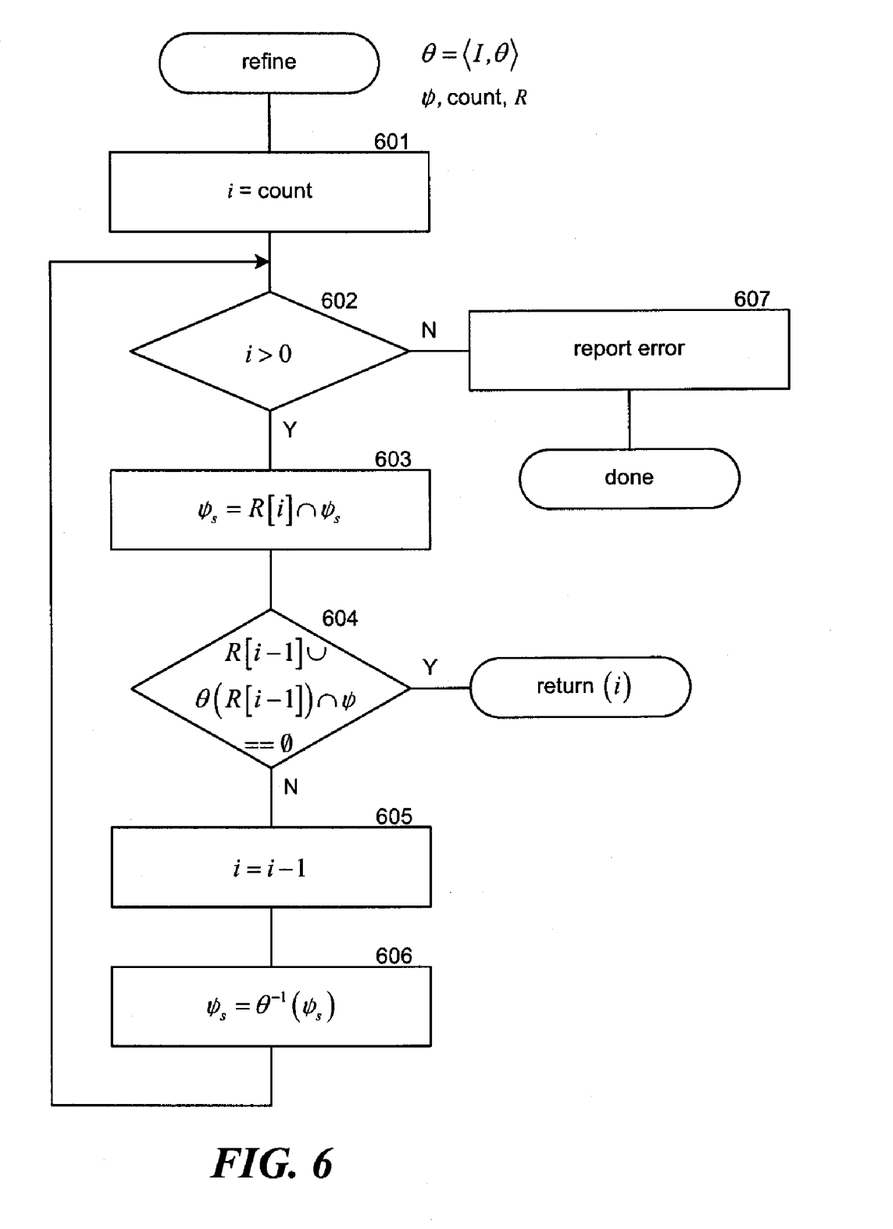
FIG. 6 is a flow diagram that illustrates the processing of a refine component of the refinement system in one embodiment.

FIG. 6 is a flow diagram that illustrates the processing of a refine component of the refinement system in one embodiment. The component is passed the transition system and the specification. The component locates the step that is the source of the imprecision leading to the error and indicates whether it is a false error or a true error. In block 601, the component sets the current step to the step that generated the error state. In decision block 602, if not all the previous steps have already been selected, then the component continues at block 603, else the component reports a true error in block 607 and completes. In block 603, the component sets the suspect states to the previous suspect states that are in the states of the current step. In decision block 604, if the states of the previous step and the states that those states led to do not include a suspect state, then the component returns an indication that the current step is a source of the error, else the component continues at block 605. In block 605, the component selects the previous step. In block 606, the component sets the suspect states to the states that led to the current suspect states and then loops to block 602.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method in a computer system for determining whether an error that has occurred during abstract interpretation of a transition system is a true error or a false error, the transition system specifying an initial state, transitions between states, and an error state, the method comprising:
   detecting that a current step leads to the error state; and
   upon detecting that a current step leads to the error state, repeating the
      following until a false error or a true error is detected:
      when the union of states of the previous step of the current step and states that are directly led to by the states of the previous step includes no current suspect state that may lead to the error state, indicating a false error,
      setting new current suspect states to the states that directly lead to the current suspect states,
      setting the current step to the previous step, and
      when the states of the current step include only the initial state, indicating a true error.

2. The method of claim 1 including upon detecting that a current step leads to the error state, setting the initial suspect states to the error state.

3. The method of claim 1 wherein the transition system specifies transitions from a current state to a next state for each state.

4. The method of claim 1 wherein the transition system is derived from a computer program.

5. The method of claim 1 including establishing states for a current step based on states of a previous step starting from the initial state in accordance with the transition system.

6. The method of claim 5 wherein the establishing of states includes using a widening operator to over-approximate the states.

7. The method of claim 6 including when a false error is indicated, establishing the states of the current step more precisely than when previously established using the widening operator.

8. The method of claim 7 including re-establishing the states for steps after the current step at which the false error was indicated.

9. The method of claim 7 wherein the re-establishing of states takes, for each step of re-establishing, the intersection of new states for the step with the states of a previous iteration for that step.

10. A method in a computer system for performing abstract interpretation of a program represented by a transition system, the transition system specifying an error state, the method comprising:
    establishing states for steps of the transition system using a widening operator that over-approximates the states; and
    upon detecting that the established states for a step includes an error state,
       identifying one of the previous steps that included a state that led to the error state as a result of the over-approximation;
       establishing states for the identified step using an operator that more precisely specifies the states than the widening operator; and
       establishing states for steps after the identified step based on the re-established states of the identified step.

11. The method of claim 10 including when the over-approximation of the widening operator did not result in the error state, indicating that the program includes an error.

12. The method of claim 10 wherein the transition system specifies transitions from one state to another state for each state.

13. The method of claim 10 wherein an initial state is specified by the transition system.

14. The method of claim 10 wherein the more precise specification of the states is based on a least upper bound.

15. The method of claim 10 including recording the identified step so that subsequent re-establishing of the states of the identified step can also be more precise.

16. The method of claim 10 wherein the identifying includes backtracking through the steps using suspect states starting with the error state until a step whose states do not include a suspect state is found.

17. The method of claim 16 wherein the identified step is the step after the step whose states do not include a suspect state.

18. The method of claim 16 wherein during backtracking the suspect states are set to the states of the previous step that led to the current suspect states.

19. A computing device with a processor and memory for performing abstract interpretation based on a transition system, the transition system specifying an initial state, transitions between states, and an error state, comprising:
    a component that, for each step specified by the transition system, establishes states of the steps based on the transition system using a widening operator that over-approximates states and using a more precise operator when the widening operator previously led to a step with one of its states including the error state; and
    a component that detects whether states for a step include an error state, identifies one of the steps with a state that led to the error state because of the widening operator, indicates that the states for the identified step are to be established using the more precise operator, and directs the component that establishes states to establish states starting at the identified step.

20. The computer device of claim 19 wherein when no step is identified, indicating that the transition system includes a true error.

* * * * *